Nov. 29, 1932.  J. F. WERNER  1,889,579
ANTIVIBRATION DEVICE
Filed Aug. 30, 1929
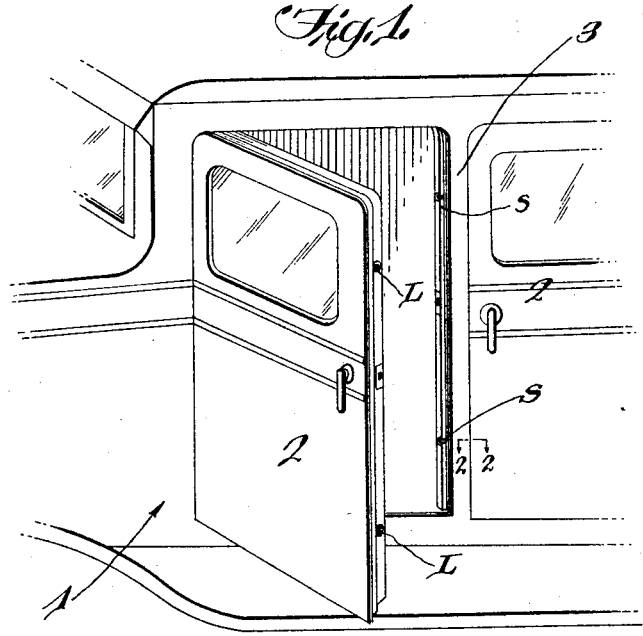
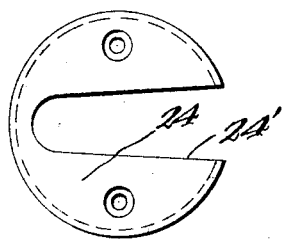
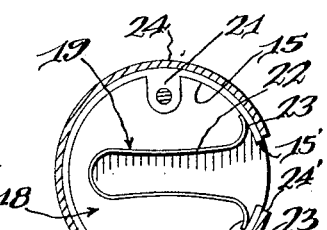
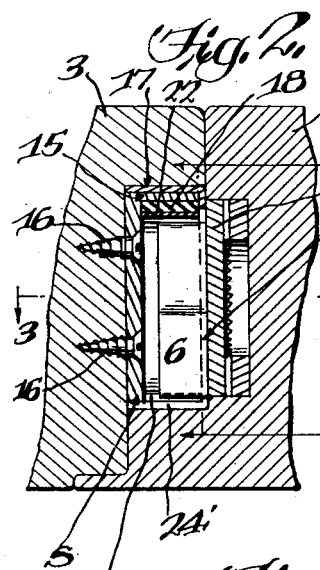
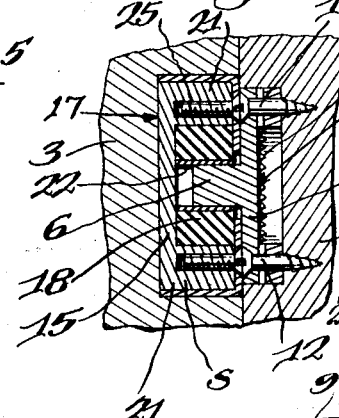
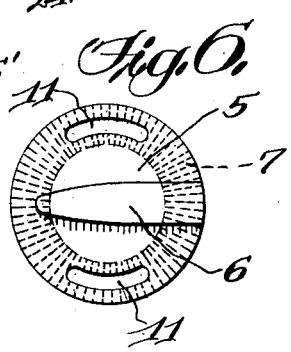
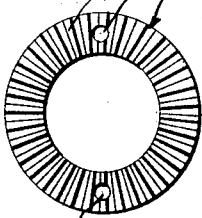
Inventor
Johannes F. Werner
By
Attorneys Patented Nov. 29, 1932

1,889,579

UNITED STATES PATENT OFFICE

JOHANNES FRIEDRICH WERNER, OF HARTFORD, WISCONSIN

ANTIVIBRATION DEVICE

Application filed August 30, 1929. Serial No. 389,359.

This invention relates to an improved anti-vibration device especially adapted for use on automobile doors.

In coach work and particularly in connection with automobile bodies, it is the custom to provide the doors of the automobile body with one or more anti-vibration devices. These anti-vibration devices are usually in the form of a lug and socket, the lug being screwed or otherwise suitably attached to the door and socket being similarly fastened or secured in a recess provided in one of the posts or jambs of the door framing. When the door is closed the lug fits in the socket and functions to prevent vibration and also to maintain the door in proper position with relation to the body of the automobile. Heretofore it has been a matter of serious difficulty and some expense to properly position the lug with respect to the socket. Very frequently automobile bodies have a belt line or stripe which extends around the sides and back of the body and of course, in part, extends across the doors. The portion of the belt line or stripe on the doors must be accurately lined up with the portions thereof on the remainder of the body. In spite of all precautions the doors will sag slightly after being hung and this sag, unless taken up by the anti-vibration device when the door is closed, will distort the belt line or stripe and impair the appearance of the automobile body. The proper positioning of the lug and socket to insure complete alignment of the stripe as well as to prevent the door from vibrating has been, as pointed out above, the occasion of considerable difficulty and this is especially true in metal bodies where it is not always convenient and requires considerable work to shift the lug or socket or the door or jamb.

One of the principal objects of the present invention is to provide an anti-vibration device which embodies in its structure provision for relative adjustment of the lug and socket for the purpose of taking up wear and also for the purpose of elevating the doors slightly where such elevation is necessary or desirable to compensate for sag or to preserve alignment of the belt line or stripe if either is provided on the body of the car.

Another object in the present invention is to provide an adjustable anti-vibration device of this character which is easily installed and adjusted and which may be adjusted either at the time of installation or at any time thereafter.

Another important object of the invention is to provide an anti-vibration device having these advantages and capacities and which embodies a novel form of socket to impart to the device a silent, cushioning action permitting of the provision of a simple form of adjustment.

A further object is to provide a device of this character which is of simple and durable construction, reliable and effective in operation and easy and comparatively inexpensive to manufacture and install.

Other objects and advantages reside in certain novel features of the construction, arrangement and combination of parts which will be hereinafter more fully described and particularly pointed out in the appended claims, reference being had to the accompanying drawing forming a part of this specification, and in which:

Figure 1 is a fragmentary perspective view illustrating an automobile body equipped with anti-vibration devices embodying the present invention;

Figure 2 is a fragmentary view in horizontal section taken in the plane of line 2—2 of Figure 1 showing one of the anti-vibration devices embodying the present invention;

Figure 3 is a view in vertical section taken on line 3—3 of Figure 2;

Figure 4 is a detail view in elevation of the cover for the socket;

Figure 5 is a view in section taken on line 5—5 of Figure 2;

Figure 6 is a detail view in elevation of the lug;

Figure 7 is a similar view of the attaching plate for the lug; and

Figure 8 is a group view in perspective showing another form of adjustable lug.

Referring to the drawing the numeral 1 designates generally an automobile body of any suitable construction and which has doors 2 hinged or hung in the usual manner on the body and interfitted when closed with a post or door jamb 3.

The doors 2 are provided with anti-vibration devices embodying the present invention, two such devices being provided on each door. In accordance with the usual practice each anti-vibration device consists generally of a lug L on the door and a socket S on the post or door jamb 3.

The lug L comprises a base plate 5 preferably of circular form and having a transverse and lateral projection or lug proper integrally formed therewith and designated at 6. The under surface of the base 5 is provided around its periphery with a circular series of radially extending projections or teeth 7. In connection with the lug L a separate, annular attaching plate 8 is provided and has one face formed with a circular series of radially disposed teeth or projections 9 designed to interfit with the projections 7 of the base 5 in any of various angular adjustments. At diagrammatically opposite points the attaching plate 8 is provided with holes or openings 10 which in the assembly underlie arcuate slots 11 formed in the base 5. The attaching plate 8 is fastened to the door and the base 5 of the lug L is secured in any selected angular position relative to the attaching plate 8 by means of screws 12 which extend through the slots of the base 5 of the lug and through the openings 10 of the attaching plate 8 and screw into the door structure or into threaded sockets provided therein. The heads of the screws are countersunk in the portions of the base 5 adjacent the slots 11. In this way the screws 12 operate to hold the teeth 7 and 9 interfitted in the selected adjustment and they also secure the lug and its attaching plate together and to the door.

The socket S includes a cup-like casing 15, the base of which is fastened by countersunk screws 16 in a recess 17 provided therefor in the post 2. A filler 18 of rubber or other cushioning material is fitted in the cup-like casing 15 and this filler 18 is transversely slotted as at 19 to adapt it to accommodate the lug 6 and it is preferably notched as at 20 to receive internal enlargements or bosses 21 of the casing 15. A U-shaped spring 22 lines the slot 19 of the filler plug and has curved out-turning ends 23 confined between portions of the plug and the flange of the cup-like casing. The socket is completed by means of a cover 24, a flange of which telescopes the flange of the casing 15, the cover being secured in position by screws 25, the heads of which are countersunk in the cover 24 and the shanks of which thread into the internally threaded openings formed in the bosses or enlargements 20 of the casing 15. The flange of the casing 15 is provided with a slot 15' and both the flange and body of the cover 24 are slotted as at 24' to permit the passage of the lug 6 into and out of the socket.

With this construction the socket and lug are positioned on the door jamb and door respectively as accurately as practical in the first instance, but unlike the prior devices of this character, after the first installation the lug may be easily adjusted to take up for wear or to elevate the door should the same slightly sag. Such adjustment is effected by loosening the screws 12, then pulling the lug L outwardly away from its attaching plate until the teeth 7 and 9 are disengaged whereupon the lug is turned until the projection or lug proper 6 is appropriately angled with respect to the horizontal. Such angular disposition of the lug 6 will cause it to elevate the door more or less when the lug is engaged in the socket. The flaring formation of the slot in the socket (see Figure 5) and the yieldable character of the walls of the slot of the socket presented by the U-shaped spring 22 and elastic filler plug 18 permits the angular disposed lug to interfit with the socket and function to elevate the door and also prevent vibration. Of course, the lug is firmly gripped in the elastic socket, but this does not interfere with easy opening and closing of the door although it does firmly hold the door in proper position.

In Figure 8 a slightly modified form of lug construction and mounting is illustrated. As shown, the lug in Figure 8, which is designated at 6', is integral with the base plate 5' of rectangular form and having integral with and projecting rearwardly from its inner face, a plurality of transversely extending teeth designated at 7'. In conjunction with this lug 6' an attaching plate 8' is provided and is also of rectangular form and is provided on its outer face with transversely extending teeth or projections 9'. In the assembly the teeth or projections 7' of the base of the lug 6' interfit in various vertical adjustments with the teeth 9' of the attaching plate 8'. The teeth 7' and 9' are held interengaged and the base plate of the lug and the attaching plate 8' are secured in position on the door by means of suitable fastening devices designated diagrammatically at 12' and extending through slots 11' provided in the base plate 5' and through openings 10' provided on the attaching plate 8'. By loosening the fastening devices the teeth 7' and 9' may be disengaged to permit the lug to be shifted relative to the attaching plate and to the fastening devices and to permit of vertical adjustment of the lug.

While two embodiments of the invention have been shown, obviously various changes may be made in the construction, shape and arrangement of the parts within the scope and spirit of the invention of the following claims.

The invention claimed is:

1. In a device of the character described, the combination with a socket member adapted to be carried by one of two members swinging relative to each other to open or closed position and having a transverse slot therein, of a lug carried by the other member and adapted to interfit in the slot when the members are in closed position, and means for mounting the lug thereon for angular adjustment whereby one of said members is elevated upon approaching the other member.

2. In a device of the character described, the combination with a socket member adapted to be carried by one of two members swinging relative to each other to open or closed position and having a transverse slot therein, of a lug carried by the other member and adapted to interfit in the slot when the members are in closed position, means for mounting the lug thereon for angular adjustment whereby one of said members is elevated upon approaching the other member, said means comprising an attaching plate having teeth on its forward face and a base plate having teeth on its rearward face, and means for securing the attaching plate and base plate to the second member with the teeth in interfitting relation.

3. In a device of the character described, the combination with a socket member adapted to be carried by one of two members swinging relative to each other to open or closed position and having a transverse slot therein, of a lug carried by the other member and adapted to interfit in the slot when the members are in closed position, means for mounting the lug thereon for angular adjustment whereby one of said members is elevated upon approaching the other member, said means comprising an attaching plate having teeth on its forward face and openings therein and a base plate having teeth on its rearward face and slots therein registering with the openings in the attaching plate, and means extending through the slots and openings for securing the attaching and base plates to the second member with the teeth in interfitting relation.

In witness whereof, I hereto affix my signature.

JOHANNES FRIEDRICH WERNER.